F. B. KNAPP.
OUTLOOK TABLE.
APPLICATION FILED DEC. 19, 1911.
1,027,855.
Patented May 28, 1912.
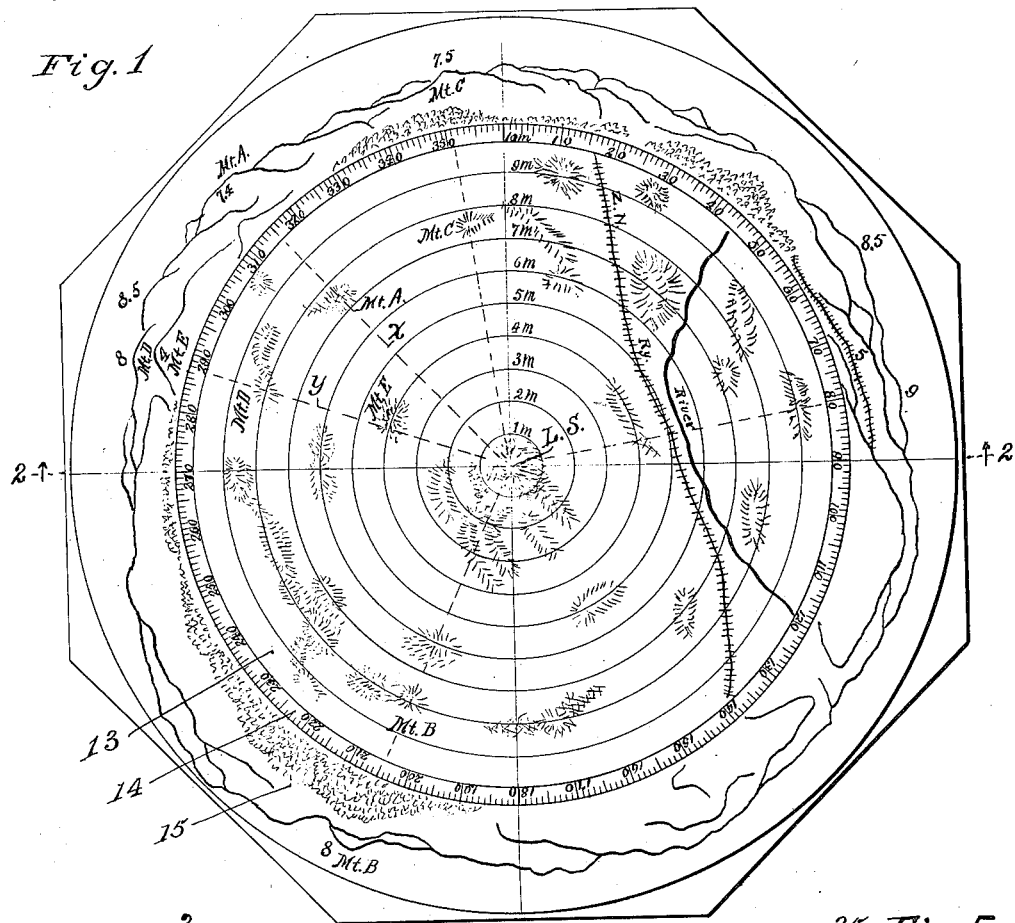
Fig. 1
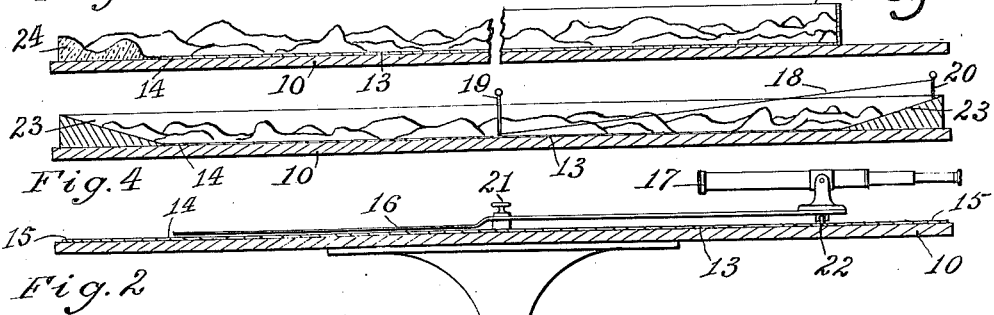
Fig. 3
Fig. 5
Fig. 4
Fig. 2
Witnesses
M. H. Yates
D. P. Winston
Inventor
Frederick B. Knapp
By Delbert H. Decker
Attorney

UNITED STATES PATENT OFFICE.

FREDERICK B. KNAPP, OF DUXBURY, MASSACHUSETTS.

OUTLOOK-TABLE.

1,027,855.  Specification of Letters Patent.  Patented May 28, 1912.

Application filed December 19, 1911. Serial No. 666,821.

*To all whom it may concern:*

Be it known that I, FREDERICK B. KNAPP, a citizen of the United States, residing at Duxbury, in the county of Plymouth and State of Massachusetts, have invented certain new and useful Improvements in Outlook-Tables, of which the following is a specification.

This invention relates to means for assisting a forest superintendent or observer in locating fires quickly and accurately and in a manner so easy of comprehension that a new recruit may be initiated on short notice.

The object of the invention is attained by the aid of a simple location finding device which may be termed an outlook table.

The invention consists in the structure and in the combination of parts embodying it for the purpose specified, substantially as hereinafter described and claimed.

For a full disclosure of the invention reference is made to the accompanying drawings, wherein—

Figure 1 is a plan of the out-look table, with alidade and telescope attachment removed; Fig. 2 is a diametrical vertical section through the device of Fig. 1 taken in the plane indicated by the line 2—2 and showing alidade and telescope in place; Figs. 3 and 5 are sectional views similar to that of Fig. 2 showing modifications of a part of the device, only one half of the table top being represented in each instance; and Fig. 4 is a like sectional view with simplest form of alidade.

In locating a forest fire from a look-out station it is essential to approximate the distance as well as to determine the direction and to do all in a simple and quick manner so that in times of frequent fires substitutes or new recruits may be readily instructed and safely entrusted with the charge of a station. The present invention meets these requirements. As shown in Figs. 1 and 2 of the drawings, a table having a top 10 and pedestal 11 is provided. This table may be of any suitable form and construction that will permit of removal from one position to another and yet be adapted for orientation and for fixing in place at any particular locality. Leveling screws such as indicated at 12 in the base of the pedestal may be used for holding the table against displacement as well as for leveling.

On the table the look-out paraphernalia may be mounted. This, preferably, consists of a topographic map 13, an azimuth scale 14, a panoramic map 15, and some convenient form of alidade. An alidade (16) and telescope (17) combined as indicated in Fig. 2 are preferred, though a string 18 and pins 19 and 20 (see Fig. 4) serve very well the purpose of an alidade; the pin 19 being located at the center of the map and the pin 20 being adapted for location at any desired point about the periphery of the topographic map or of the panoramic map, as desired. A topographic map, as 13, is made of the territory within convenient view of each look-out station having said station as its center, as indicated at L. S. (Fig. 1), and is preferably provided with mile circles. These circles are indicated by 1m. 2m., &c. At any desired location upon the map or upon the table, though preferably about the periphery of the topographic map, the scale 14 graduated to degrees, and preferably reading up to 360°, is located and to it the direction of fires sighted is referred.

The panoramic map 15 may or may not be used, though it is of considerable service to an observer on taking up a new look-out station. Upon this map, as indicated in the drawings, the actual physical features are represented perspectively in their relative locations and in direct radial relationship with respect to their positions upon the topographic map 13. For example, Mt. A in the panoramic map 15 is seen in radial alinement with Mt. A in topographic map 13, as indicated by the radius $x$, and Mts. D and E in the panoramic map 15 are in radial alinement with said mountains represented upon map 13. The simplest and preferable plan for producing the maps is to form both together, make a tracing thereof and from that take blue prints, as indicated in Figs. 1 and 2, so that the maps may be readily replaced when they become soiled or damaged. The scale 14 is preferably made a part of the blue print.

The combined alidade and telescope as used in a surveyor's plane table may be adapted to the table and maps above described but a simpler combination of alidade and telescope is preferred. Such simple device may be produced in various ways, one being exemplified in Fig. 2, wherein the alidade 16 is pivoted at the center of the table, with which the centers of the maps coincide. The alidade has an extension beyond the pivot 21, and upon the end of this extension the telescope 17 is pivoted for depression and elevation. At the under side of said extension a roller 22 may be provided to support the weight of the telescope, said roller running upon the map or table.

In sighting a fire through the telescope the alidade will point from the center of the map to the location of the fire and to the section of the panoramic map representing the location of the fire while along the alidade may be located, in radial alinement with the fire, the same section of country. The observer can then by aid of the panoramic map note between what mountains and ridges the fire appears to be and by glancing along the alidade determine by the mile circles the distance the fire is from his station. For instance, if the observer sees smoke arising in the northwest, he swings the telescope mount around and trains the telescope in that direction. He may determine that the fire is on the near face of a mountain of considerable height. He looks at the panoramic map and observes that there is but one mountain of like proportions in that radial line and that it is Mt. A. Then by a glance at the topographic map he sees that Mt. A is 7.5 miles distant. This distance helps him to locate the warden or ranger stationed nearest to the fire and to him he telephones that smoke is visible at 315° apparently on the near face of Mt. A, 7.5 miles distant. The warden by reference to his own map takes note of the relative location of the out-look sending the message and the direction and distance given. He then lays his course accordingly.

Instead of using a combined telescope and alidade as just described, the direction of a fire may be determined by sighting it over the head of pin 19 at the center of the out-look map (Fig. 4) and the pin 20 moved into the radial line of view. The string 18 will then serve as an alidade to assist in finding the location of the fire upon the map. If the panoramic map is omitted the observer then judges the distance of the fire by its apparent location relative to the features of the topographic map under the alidade.

The panoramic map may be variously constructed. It may be flat, as indicated in Figs. 1 and 2, or on an incline, as indicated in Fig. 4 at 23. It may be a contour map molded, as indicated at 24, in Fig. 3, or it may be drawn on a vertical wall, as indicated at 25, in Fig. 5. This wall may be transparent or not. If transparent the distant fire may be viewed through it and the objects represented upon it may be made to cover the real objects in the distance.

Various modified forms of the apparatus aside from those above indicated may be adapted for the embodiment of the invention in question which is specifically pointed out in the following claims.

1. The combination with a table, of a map adapted to be located thereon and provided with a circular scale graduated in degrees, and an alidade having sighting means and mounted upon said map and movable at will into any radial position determined by aid of the sighting means.

2. The combination of a topographic map, a concentrically located circular scale graduated in degrees, a panoramic map, and means serving as an alidade to establish radial lines across both maps, for the purpose set forth.

3. The combination with a circular topographic map, of an azimuth scale, and a panoramic map showing the principal features of the topographic map and so located with relation to the topographic map that the corresponding features of the two maps will be in radial alinement.

4. The combination with a circular topographic map, of an azimuth scale, a panoramic map showing the principal features of the topographic map and so located with relation to the topographic map that the corresponding features of the two maps will be in radial alinement, and an alidade pivoted at the center of the azimuth scale and adapted to show the radial relation between the corresponding features of the two maps and to indicate their azimuth.

In testimony whereof I affix my signature in presence of two witnesses.

FREDERICK B. KNAPP.

Witnesses:
THEODORE W. GLOVER,
SIDNEY C. SOULE.